J. F. EVERS.
PORTABLE STANCHION.
APPLICATION FILED APR. 27, 1921.

1,427,274. Patented Aug. 29, 1922.

Inventor
John F. Evers.

By
Watson E. Coleman, Attorney

UNITED STATES PATENT OFFICE.

JOHN F. EVERS, OF DENISON, IOWA.

PORTABLE STANCHION.

1,427,274. Specification of Letters Patent. Patented Aug. 29, 1922.

Application filed April 27, 1921. Serial No. 464,800.

*To all whom it may concern:*

Be it known that I, JOHN F. EVERS, a citizen of the United States, residing at Denison, in the county of Crawford and State of Iowa, have invented certain new and useful Improvements in Portable Stanchions, of which the following is a specification, reference being had to the accompanying drawings.

This invention relates to portable stanchions, and has for its object to provide a device of this character especially arranged for use in dehorning and castrating cattle, ringing hogs, and various other treatments of domestic animals.

It is also an object of the invention to provide a stanchion of this character capable of being so positioned that the animal may readily enter, and wherein the exit from the stanchion is closed when the head of the animal projects beyond the entrance.

It is a further object of the invention to provide a stanchion of this character including a pair of end frames which are connected by means of side members to form the stanchion, said frames not only forming part of the stanchion, but serving as supports for the various means used to retain the animal within the stanchion.

With these and other objects in view, the invention consists in the improved construction and arrangement of parts to be hereinafter more particularly described, fully claimed and illustrated in the accompanying drawings in which:—

Figure 1:
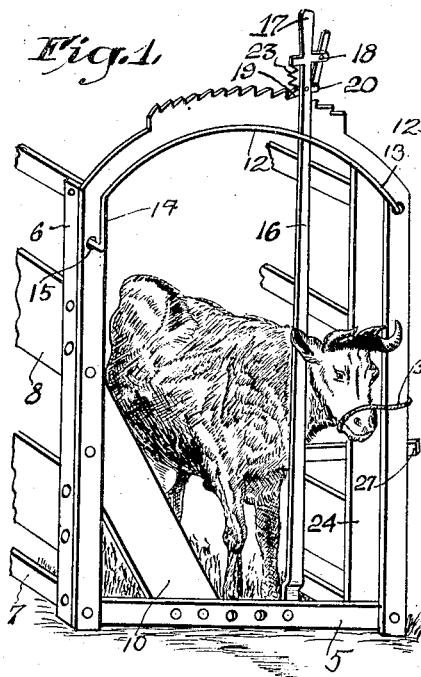
Figure 2:
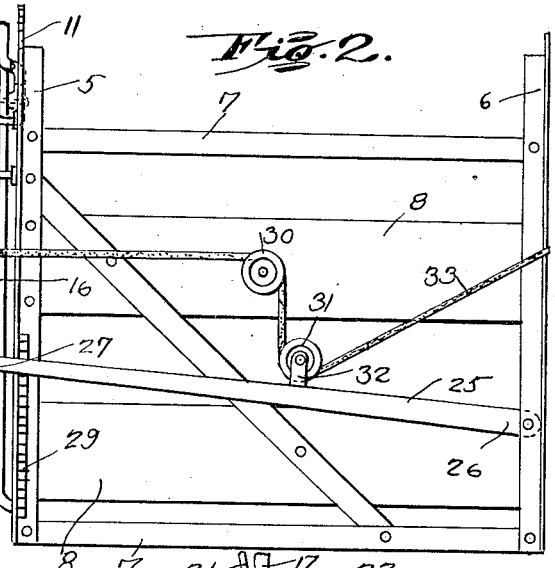
Figures 3, 4:
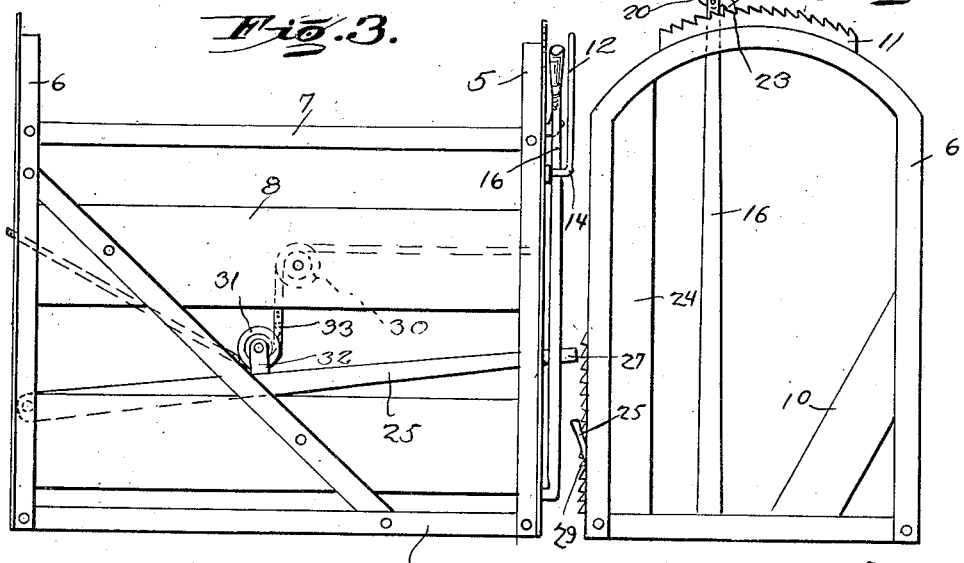

Figure 1 is a perspective view of a stanchion constructed in accordance with an embodiment of the invention, Figure 2 is a side elevation, Figure 3 is a side elevation taken from the opposite side of the structure shown in Figure 2, and Figure 4 is a rear elevation showing the lever in its closed position.

Referring to the drawings, the improved portable stanchion comprises a front frame 5 and a rear frame 6, the upper portions of said frames are arched and not only properly brace the stanchion, but serve as supports for parts of the mechanism, as will be hereinafter explained. Each of the frames 5 and 6 is constructed of angle iron members, and is adapted to be disposed in spaced relation to each other, the frame 6 forming the entrance to the stanchion. Angle iron members 7 are used to connect the frames 5 and 6, one of said angle iron members being disposed at the bottom and adjacent the top of each of the sides of the frames. A plurality of side members 8 are connected to a flange of the frames 5 and 6 and extend between the same similar to the angle iron members 7 and cooperate with said members to form the side walls of the stanchion. Boards or like means are used as flooring for the stanchion, and similar to the members 8 extend between and are secured to the frames 5 and 6. The front frame 5 has a portion thereof obstructed by means of a strip 10 which extends obliquely of the frame and is adapted to close one corner of the frame to render it impossible for an animal to pass through the frame at that point. The upper arched portion of the frame 5 is provided with a rack 11 which extends on both sides of the intermediate portion of said member and terminates adjacent the side members of the frame. This rack serves as a portion of locking means to prevent the escape of the animal. A guide member 12 is provided, the end 13 of said member being secured to the upper portion of one of the vertical members of the frame, while the end 14 is extended substantially parallel to the opposite vertical member of the frame, and secured as at 15. It will be noted that the guide member 12 conforms to the curvature of the arched upper portion of the frame, and that the end portion 14 extends below the end portion 13.

Pivoted to the lower portion of the frame 5, adjacent the strip 10, is a retaining lever 16, said lever being considerably longer than the frame 5, and having its end portion 17 disposed between the guide 12 and the arched portion of the frame 5. The end portion 17 of the lever includes an extension 18. A pawl 19 is pivoted to the lever, beneath the extension 18. The end 20 of the pawl 19 is intended to engage the end of the lever 21 which is pivoted to the extension 18. A second extension 22 is carried by the lever remote from the extension 18, and is adapted to receive one end of a spring 23 which is used to urge the pawl 19 downwardly. The pawl 19 is intended to ride over the rack 11 when the lever 21 is released from the end of the pawl 19 so as to permit the lever 16 to be moved to the desired point on the rack according to the size of the head of the animal within the stanchion. When the lever 21 is swung into engagement with the projecting end of the pawl, the spring 23 is prevented from operating, and carries the pawl to lock the lever through the medium of the rack in the desired adjusted position. Extending vertically of the frame 5 closely adjacent one of the vertical members of the frame is a strip of material such as wood, 24, which cooperates with the lever 16 to hold the head of the animal therebetween.

As shown in Figure 1 when the lever 16 is not in use it is disposed adjacent the end 14 of the guide so as to cooperate with the strip 10 to partially close one end of the stanchion, and leave a relatively large opening between the lever and the strip 24. In view of this, the animal will endeavor to leave the stanchion through the large opening, whereupon the operator may swing the lever 16 toward the member 24 as the head of the animal passes through the frame 5 and thereby clamp the neck of the animal as above described, through the medium of the pawl 19 and the rack 11.

To assist in dehorning and like treatment of domestic animals, there is provided novel means for preventing movement of the head of the animal after the neck of the animal has been clamped between the lever 16 and strip 24. This means embodies a lever 25 which is pivoted at its end 26 to the rear frame 6 adjacent the lower portion of the frame. The end portion 27 of the lever extends toward and projects beyond the frame 5 to provide a hand grip or pedal. A tooth 28 is carried by the end portion 27 of the hand grip adjacent the frame 5 and is adapted at certain times to engage a rack 29 formed on the side or vertical portion of the frame 5 so as to hold the lever in various adjusted positions. A pulley 30 is pivoted to one of the side members 8 of the stanchion and is adapted to cooperate with a pulley 31 which is mounted in a bracket 32 carried by the intermediate portion of the lever 25. A cable or rope 33 is passed over the pulley 30 and beneath the pulley 31, and as the pulleys are disposed closely adjacent each other, movement of the lever 25 will cause the cable or rope 33 to be tightened. One end of the cable 33 is passed over the animal's head, under the throat, and over the nose, the opposite end of the cable being secured to any suitable support so that in this way the head of the animal will be held steady during the dehorning operation or other treatment of the animal.

By the novel construction of the end frames 5 and 6, transverse braces are unnecessary as the arch and lower portion of the frame properly brace the stanchion and in the case of the front frame, the arch serves as a portion of the operating mechanism. The rear frame is also used as a portion of the operating mechanism by providing a support for the lever 25, while the frame 5 cooperates with the lever to lock the same in position. There is a cooperation between the levers 16 and 25 in holding the head of the animal properly for various treatments. It will be noted that the rack 11 of the frame 5 terminates in spaced relation to the vertical members of the frame. This is to permit the operator to swing the lever unobstructedly so as to readily catch the head of the animal when the same passes through the frame 5, therefore, when not in use, the pawl 21 is not engaged with the rack.

From the foregoing it will be readily seen that this invention provides a novel form of portable stanchion capable of being used for various purposes and wherein the construction of the device is very simple, as all of the operating parts are carried by or incorporated in the end members of the stanchion so that in case the side members of the stanchion become damaged they may be readily removed and replaced by any suitable material without interfering with the operation of the movable parts carried by the end members of the stanchion.

What is claimed is:

A stanchion of the character described embodying a pair of end frames, means for connecting said frames to each other, a rack carried by the top of one of said frames, a second rack carried by the side portion of said frame, a lever pivoted to said frame and provided with means for engagement with the upper rack, a lever pivoted to the opposite frame and provided with means for engagement with the second mentioned rack, a pulley carried by the connecting means of the frames, a pulley carried by the second mentioned lever, and a cable engaged with said pulleys one end of said cable being secured to an animal's head, the opposite end of said cable being secured to a support, said cable being tightened upon movement of the second mentioned lever.

In testimony whereof I hereunto affix my signature.

JOHN F. EVERS.